Sept. 21, 1943.     C. C. KITTERMAN     2,330,125
TRAILER COUPLER
Filed Dec. 22, 1941     2 Sheets-Sheet 1

Inventor
Carl C. Kitterman
by Orwig & Hager
Attys

Sept. 21, 1943.　　　C. C. KITTERMAN　　　2,330,125
TRAILER COUPLER
Filed Dec. 22, 1941　　　2 Sheets-Sheet 2

Inventor
Carl C. Kitterman
by Orwig & Hague
Attys

Patented Sept. 21, 1943

2,330,125

UNITED STATES PATENT OFFICE 2,330,125

TRAILER COUPLER

Carl C. Kitterman, Albia, Iowa

Application December 22, 1941, Serial No. 423,975

5 Claims. (Cl. 280—33.15)

This invention relates to an improved coupler or hitch of the type used to connect to a self-propelled vehicle, such as a tractor or truck; various types of portable devices for machinery, such as two-wheeled trailers, semi-trailers, or field artillery, which are designed to be rapidly drawn over the ground surface. The present invention is particularly adapted to be used in connection with high speed self-propelled vehicles, such as tractors, to be rapidly operated over rough and uneven ground surface, to which two wheeled vehicles are attached, such as trailers or portable field artillery, wherein an upset or turn-over of the tractor or the vehicle being drawn is likely to occur.

An object of my invention is to provide a coupler so constructed and arranged that when a trailer is being drawn by a tractor and an upset of either the trailer or the tractor occurs, no twisting of the coupler or its parts will result, the coupling members being adapted to be easily released under these adverse conditions.

A further object of my invention is to provide a coupler of the type above described, of comparatively simple construction, having few moving parts, which parts are protected from the weather and against becoming jammed due to formation of ice, mud, sand or other frozen substances.

A further object is to provide a coupler comprising coupling elements and locking and latching means for retaining the elements in coupled relation wherein the locking means are secured in locking position by their weight, so that the use of springs is entirely eliminated, said locking and latching means being so arranged and constructed that coupling may be positively accomplished by simply moving the two coupling elements toward each other.

A further object of my invention is to provide in a coupler of the type above described a cover plate for covering and enclosing the coupling and latching elements to protect them from the elements of weather, said cover plate being adapted to be automatically moved to closed position and latched in said closed position when coupling operation takes place, a further object being to provide in connection therewith means wherein the coupling may be automatically accomplished even if the cover plate is in its closed position, by simply moving the coupling members together.

A further object is to provide in a coupler having a coupling element provided with a transversely arranged coupling groove, a second coupling element having a coupling rod adapted to be moved into the groove, and in connection therewith means for hooking or locking the coupling rod therein, and in connection therewith means for lifting the coupling rod out of the groove as the locking means is moved to its open position, wherein uncoupling of the elements may be accomplished by simply moving one element away from the other.

A further object is to provide a coupler of the type above described having greater flexibility wherein if either the trailer or the tractor should become upset, no injury will be imparted to the coupler and wherein the relative turning angle between the tractor and the trailer may be greatly increased both in horizontal and vertical planes.

My invention consists in the construction, arrangement and combination of the various parts of the device, whereby the objects contemplated are attained, as hereinafter more fully set forth, pointed out in my claims, and illustrated in the accompanying drawings, in which:

Figure 3:
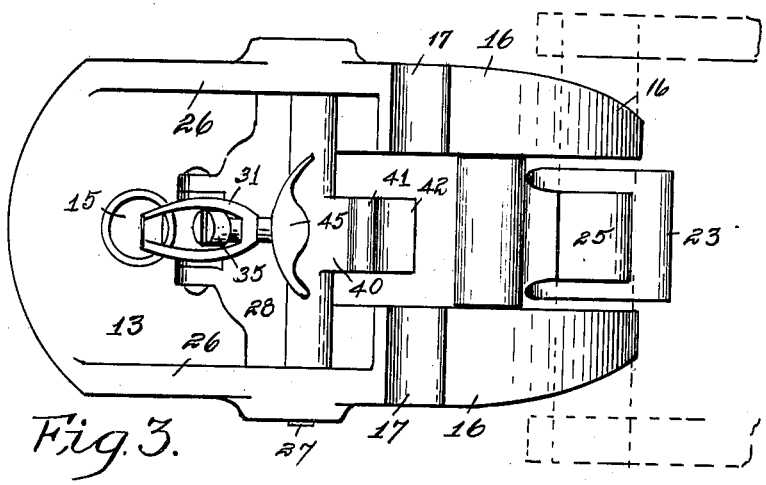
Figure 3 is a plan view of Figure 2.

In the drawings I have used the reference numeral 10 to indicate generally a tractor frame and 11 generally the trailer frame. For the purpose of simplicity in the description of this device and in the claims, I have used the term "tractor" or "tractor frame" as applied to any vehicle furnishing power for pulling or operating a portable machine or device over the ground surface, and the term "trailer" or "trailer frame" as applied to any vehicle such as a trailer, semi-trailer, or piece of artillery drawn by said tractor.

My improved coupler comprises a coupling element 12 which is preferably in the form of a plate 13 having an opening 14 for receiving a pin 15 by means of which the said plate is pivotally mounted on one end of the frame 10 to swing about said pivot in a horizontal plane and through an angle of substantially 180°. The free end of the plate is provided with a separated pair of guide devices 16 which are curved outwardly and rearwardly from their inner ends and having the upper surfaces of their inner ends provided with what I shall term coupling recesses 17, said recesses being adapted to support a coupler rod 18 when coupling is accomplished, said recesses being of a depth greater than one-half the diameter of the rod, the said rod 18 being advanced in the free ends of the yoke 19 having at its bight a rearwardly extending pivot member 20 rotatably mounted in a bearing 21 fixed on the trailer frame 11, providing means whereby the yoke 19 may be rotated relative to the frame 11 when coupling is accomplished to permit the frame 11 to be rotated relative to the frame 10 about a horizontal and a longitudinal axis, a nut 22 being provided for retaining the member 20 in position.

Figure 2:
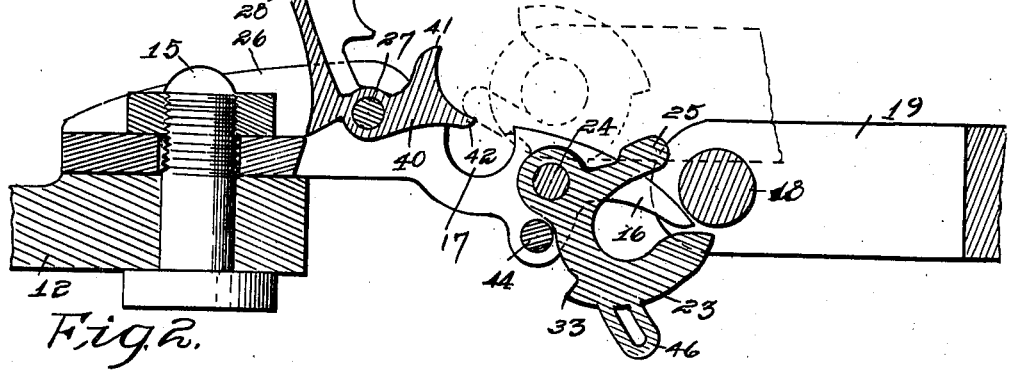
Figure 2 is a longitudinal sectional view of the coupler moved to its open position, showing the coupler rod resting on the guides, to be moved to coupling position.
Figure 4:
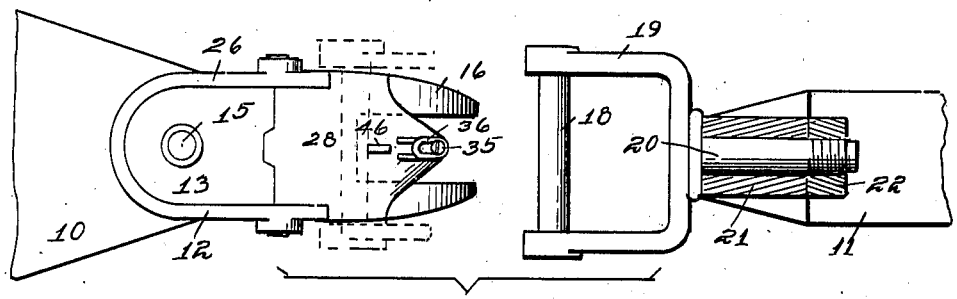
Figure 4 is a plan view of Figure 1 and also a plan view of the coupler element carried by the trailer, a portion of which is in section, to show the manner in which the yoke is pivotally mounted to the trailer frame.
Figure 5:
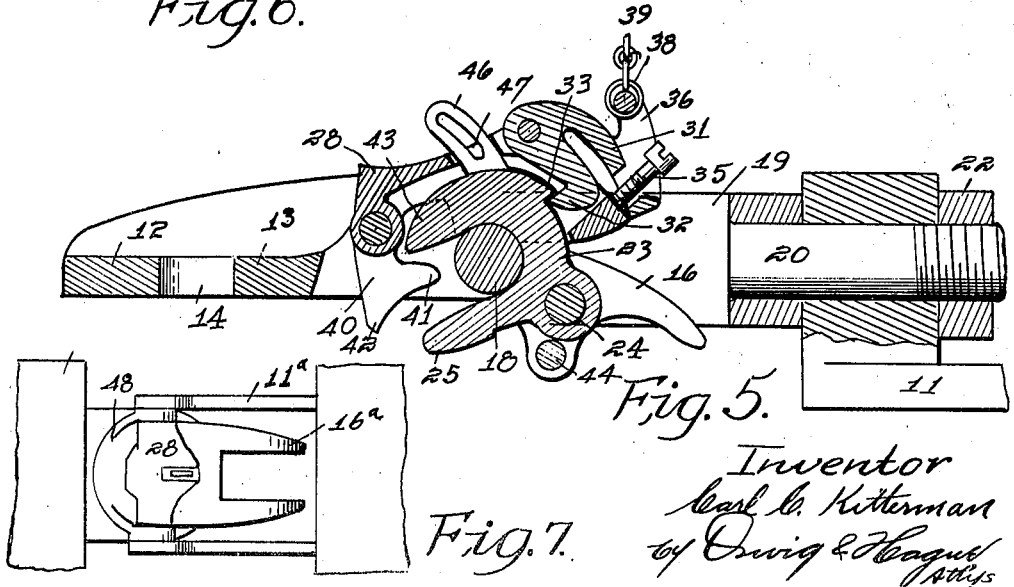
Figure 5 is a longitudinal sectional view of the coupler in its closed position.

For locking the rod 18 in the grooves 17 I have provided what I shall term a hook 23 to be mounted on the shaft 24, supported transversely between the members 16, as clearly illustrated in Figure 5, the hook being adapted to swing from the open position illustrated in Figure 2 to a closed position as illustrated in Figure 5, the said hook being provided with a lug 25 arranged to extend above the guide 16 in its open position, as illustrated in Figure 2, so as to be engaged by the rod 18 as the said rod 18 is moved forwardly and over the top of the guide 16 in such a manner as to rotate the hook to its closed position with the hook embracing said rod as shown by dotted lines in Figure 2, so as to provide means for automatically closing the hook as the rod is moved to coupling position.

Figure 1:
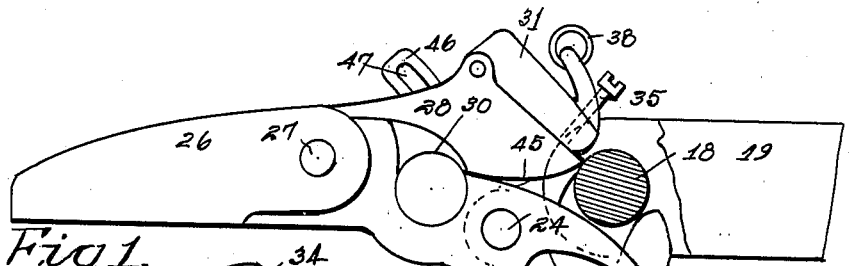
Figure 1 is a side elevation of my improved coupler, a portion of the inner end of the yoke being broken away.

The plate 13 is provided with upwardly extending flanges 26 supporting a transversely arranged shaft 27 on which a cover plate 28 is pivotally mounted, said plate having at each edge a downwardly extending flange 29 said flanges having formed in their lower edges notches 30 to be supported over the upper end of the recesses 17 and to provide closures therefor when the said cover plate is swung to its closed position, as illustrated in Figures 1 and 5. This cover plate also serves to hold the rod 18 in coupling position.

Pivotally mounted in the free end of the cover plate is a latch bar 31 having a latch 32 adapted to engage the latch device 33 carried by the hook 23 when the hook and the said cover plate are in their closed position, as illustrated in Figure 5, thus providing means whereby the cover plate is latched to closed position and the hook 23 is also latched to closed position, the latch bar 31 being formed comparatively heavy so that it will be returned to its closed position by gravity.

The forward end of the latch bar 31 is provided with a slot 34 for receiving a set screw 35 which is mounted in the forward end of the covered plate and provides means for limiting the upward movement of the latch, and also means for lifting the cover plate after the latch has been moved to its open position, the latch being provided with a pair of flanges 36 between which is mounted a pin 37 for receiving a link 38 of a lifting chain 39, wherein the latch may be released in any desired remote position.

To facilitate uncoupling of the rod 18 from the recesses 17 I have provided on the pivoted end of the cover plate a lug 40 having what I shall term a primary elevator 41 and a secondary elevator 42, the primary elevator 41 being supported beneath the free end 43 of the hook 23 when the coupler is in its closed position. By this arrangement it will be seen that if coupling has been accomplished, as illustrated in Figure 5, and it is desired to permit uncoupling to take place, then the operator elevates the latch 32, releasing it from the latch 33, after which the free end of the bar 31 engages the head of the set screw 35, causing the free end of the cover plate 28 to be elevated and the primary elevator 41 to engage the under surface of the member 33, causing the said member also to be elevated, together with the free end of the lug 26, and in turn the rod 18 to be lifted out of the recesses 17. Further movement of the cover plate would then cause the secondary elevator 42 to engage the under surface of the lug 25, as illustrated by dotted lines in Figure 2, to hold the rod 18 in its elevated position at the time the elevator 41 disengages the member 43. Uncoupling may then be completed simply by moving the tractor frame away from the trailer frame. The rod 18 will then move rearwardly and downwardly over the guides 16, carrying the hook 33 to the open position illustrated in Figure 2, which hook will then rest on a rod 44 carried by the members 16. The cover plate 28 may then be left in its open position as illustrated in Figure 2, if so desired, until it is again desired to couple the tractor and trailer frames together. If the said cover plate is left in its open position, coupling is accomplished by causing the member 18 to engage the guides 16 and be moved upwardly thereover as the frame 10 is moved toward the frame 11, causing the hook 23 to be moved to the dotted line position in Figure 2, with the lug 25 resting on the secondary elevator 42. The weight of the rod 18 moving forwardly on said lug 25 will move the secondary elevator downwardly and at the same time swing the upper end of the cover plate rearwardly until the rod 18 rests on the member 42, causing the completion of said rearward movement of the cover plate, after which the weight of the said plate will complete its closing action and the latching action between the members 32 and 33. However, it is oftentimes desirable to throw the cover plate to its closed position at such times as uncoupling is accomplished, for the purpose of preventing the recesses 17 from becoming filled with ice or mud as the tractor is moved from one position to the other, with the hook in the position shown in Figure 2. Coupling may then be accomplished by moving the rod 18 to position on the guides 16, as illustrated in Figure 1, with the said rod 18 engaging the lug 25, which in turn will engage the curved surface of the plate 28, causing said plate to be elevated, after which the free end 43 of the hook 33 will also engage said curved surface 45, causing the said cover plate to be further elevated with the rod 18 entering the space between the members 41 and 42, said rod 18 then entering the recesses 17, with the covered plate falling to its closed position by its weight.

By this arrangement it will be seen that coupling may be accomplished either with the cover plate opened or closed so that such coupling action may take place automatically without any attention of the operator as to the position of the coupling elements, or the latching devices, with the exception, of course, that the members 16 should be approximately in alignment with the yoke 19; the outer edges of the members 16 being curved inwardly so as to provide means for steering the yoke 16 laterally to a certain extent as coupling takes place.

The top end of the hook 23 is provided with a grooved segment 46 projecting upwardly through an opening 47 in the cover plate and provides additional means for locking the cover plate in position, if so desired, by simply inserting through the slot 47 a suitable key, not illustrated.

The side arms of the yoke 19 are of such length as to permit the bight of the yoke to swing down over the ends of the guides 16, as illustrated in dotted lines in Figure 5, so as to increase the angularity of the swing of the frame 11 about the rod 18 as a center. By this arrangement it will be seen that said frame may swing substantially through an angle of substantially 180° in a horizontal plane, while the frame 11 is free to swing about the pivot 20 as an axis through an angle of 360°, so that if the trailer should become upset, the danger of injury to the coupling due to twisting or pivotal movements between the tractor and the trailer frame, will be eliminated.

Figure 6:
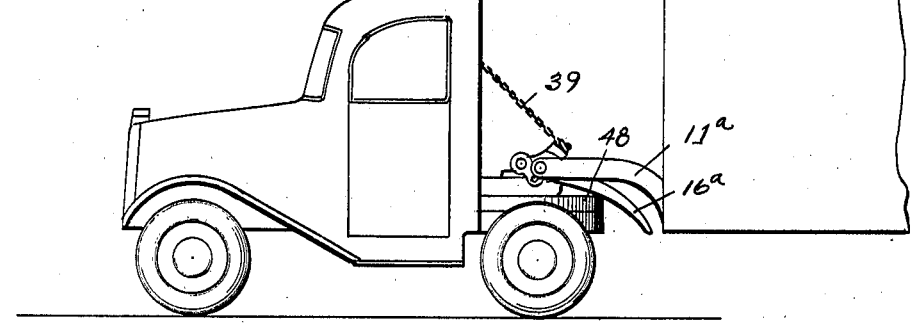
Figure 6 is a side elevation of a trailer truck showing the manner in which the coupler is adapted to the fifth wheel construction and the manner in which the semi-trailer is mounted thereon.
Figure 7:
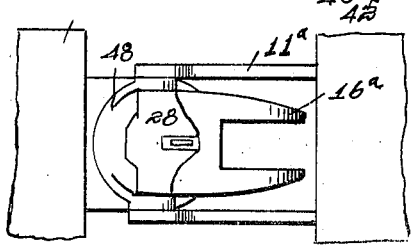
Figure 7 is a top view of the coupler arrangement illustrated in Figure 6.

In Figures 6 and 7 I have illustrated the coupler applied to a truck of the type used in connection with a semi-trailer, in which is usually employed a fifth wheel 48 which is pivotally mounted on the truck about a vertical axis, the coupler being provided with comparatively long guides 16a which overhang the said fifth wheel, the coupler being proportionately wider so that the rod 18 will permit the supporting arms 11a of the semi-trailer 49 to straddle the guides 16a and wherein the fifth wheel, being of comparatively large diameter, will increase the lateral stability of the trailer 49. The chain 39 may be located in such a manner that it may be actuated from within the cab of the truck wherein coupling and uncoupling may be accomplished without the operator leaving the cab.

By this arrangement it will be seen that I have provided a coupler of comparatively simple and durable construction, capable of withstanding great abuse and which is very reliable in its coupling, wherein coupling may be automatically accomplished by simply backing the tractor towards the trailer, the tractor and trailer units being ordinarily supported and carried at such elevation that the rod 18 will engage the lower and rear ends of the guides 16 by simply moving the tractor rearwardly, the coupling and locking elements being so arranged as to firmly clamp the couplers together so that a comparatively small amount of lost motion exists and wherein rattling and unnecessary noise are eliminated, the coupling elements being protected against the elements of the weather so that at all times coupling may be easily and quickly accomplished and so arranged that uncoupling may be easily accomplished either in case of an upset of either the tractor or trailer frame.

I claim as my invention:

1. The combination of a coupler element, having a transverse coupling recess, a second coupler element including a coupling rod adapted to rest in said recess when the coupling is accomplished, a hook for retaining the coupling rod within said recess, a pivoted cover plate adapted to move from an open position to a closed position enclosing said coupling elements when coupled; means for latching said cover plate and hook to closed positions, and means actuated by movement of the cover plate from closed position to open position for automatically lifting said coupling rod out of said notch and for releasing said hook.

2. The combination of a tractor frame, a trailer frame, a coupler element having its forward end pivotally connected to said tractor frame to swing about a vertical axis, said element having a transverse coupler recess and a rearwardly and downwardly extending guide, said second coupler element having a yoke pivotally mounted therein to swing about a horizontal and longitudinal axis and a transverse coupler rod to pivotally rest in said recess to couple said frames together, a hook pivotally supported in the first coupler element to retain the rod in said recess, means actuated by movement of said coupler rod to coupling position for automatically closing said hook, means for latching said hook to closed position, a cover plate having one end pivoted to the first coupling element, a latch carried by the free end of said cover plate for simultaneously latching said cover plate and said hook to closed position, and means for releasing said latch.

3. The combination of a tractor frame, a trailer frame, a coupler element having its forward end pivotally connected to said tractor frame to swing about a vertical axis, said element having a transverse coupler recess and a rearwardly and downwardly extending guide, said second coupler element having a yoke pivotally mounted therein to swing about a horizontal and longitudinal axis and a transverse coupler rod to pivotally rest in said recess to couple said frames together, a hook pivotally supported in the first coupler element to retain the rod in said recess, means actuated by movement of said coupler rod to coupling position for automatically closing said hook, means for latching said hook to closed position, a cover plate having one end pivoted to the first coupling element, a latch carried by the free end of said cover plate for simultaneously latching said cover plate and said hook to closed position, means for releasing said latch, means for moving said cover plate to open position, and means actuated by the opening movement of said cover plate for lifting said coupler rod out of said notch to accomplish said coupling by movement of the coupler elements one from the other.

4. The combination of a coupler element having a coupler recess and a guide device, a second coupler element, including a coupler rod adapted to ride said guide and to enter said recess for coupling said elements as said elements are moved toward each other, a hook supported by the first coupler element for retaining said coupler rod in said recess, a cover plate pivoted to said first coupler element to swing from an upright open position to a horizontal closed position, means carried by the cover plate for latching said cover plate and said hook simultaneously to closed position, and means actuated by movement of the coupler rod over said guide to coupling position for automatically closing said hook and cover plate.

5. The combination of a coupler element having a coupler recess and a guide device, a second coupler element, including a coupler rod adapted to ride said guide and to enter said recess for coupling said elements as said elements are moved toward each other, a hook supported by the first coupler element for retaining said coupler rod in said recess, a cover plate pivoted to said first coupler element to swing from an upright open position to a horizontal closed position, means carried by the cover plate for latching said cover plate and said hook simultaneously to closed position, means for moving said hook to open position as the coupler rod is moved to uncoupled position, said cover being adapted to be moved to closed position with the said hook in its open position, and means actuated by means of movement of said coupler rod to coupling position within said recess for closing said hook and for moving said cover plate to position to permit the coupling rod to enter said recess.

CARL C. KITTERMAN.